(12) United States Patent
Okabe

(10) Patent No.: US 6,307,335 B1
(45) Date of Patent: Oct. 23, 2001

(54) BRAUN TUBE DISCHARGE APPARATUS

(75) Inventor: Hirofumi Okabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/456,048

(22) Filed: Dec. 7, 1999

(30) Foreign Application Priority Data

Dec. 8, 1998 (JP) .................................................. 10-009714

(51) Int. Cl.⁷ ...................................................... G09G 1/04
(52) U.S. Cl. ........................ 315/403; 315/380; 315/384; 315/387
(58) Field of Search .............................. 315/3, 380, 381, 315/384, 386, 403, 387; 348/173; G09G 1/04

(56) References Cited

U.S. PATENT DOCUMENTS

| | | | |
|---|---|---|---|
| 3,863,096 | * | 1/1975 | Sennik ..................................... 315/20 |
| 4,217,525 | * | 8/1980 | Nakamura et al. ................... 315/381 |
| 5,714,843 | * | 2/1998 | Youn ......................................... 315/1 |
| 5,903,111 | * | 5/1999 | Shin ..................................... 315/381 |
| 5,920,339 | * | 7/1999 | Lee ....................................... 348/173 |
| 6,046,552 | * | 4/2000 | Yoon .................................... 315/380 |

FOREIGN PATENT DOCUMENTS

| | | |
|---|---|---|
| 54-163620 | 12/1979 | (JP) . |
| 60-134666 | 7/1985 | (JP) . |
| 401032766 | * 2/1989 | (JP) ................................. H04N/3/20 |
| 4-280170 | 10/1992 | (JP) . |
| 5-191753 | 7/1993 | (JP) . |
| 09154030 | * 6/1997 | (JP) ................................. H04N/3/20 |
| 10-248019 | 9/1998 | (JP) . |

* cited by examiner

Primary Examiner—Don Wong
Assistant Examiner—Shih-Chao Chen
(74) Attorney, Agent, or Firm—Lackenbach Siegel Marzullo Aronson & Greenspan, P.C.

(57) ABSTRACT

A Braun tube discharge apparatus that includes a so-called spot killer function. In the apparatus, an operational amplifier included in a vertical IC receives a vertical ramp signal from a one-chip IC at the non-inversion input terminal. The operational amplifier also receives a part of the output as a negative feedback to the inversion input terminal, and performs differential amplification of it and transmits the results to a vertical deflection coil. At the time a spot killer circuit discharges a remaining electrical charge held by a Braun tube when the power is turned off, a switching transistor is rendered conductive by using a spot killer pulse signal that instructs the activation of the spot killer circuit. When the negative feedback input side of the operational amplifier drops to the ground level, the center DC value of the vertical output signal is increased, and the amplitude is increased.

4 Claims, 5 Drawing Sheets

FIG. 2(a) VERTICAL RAMP
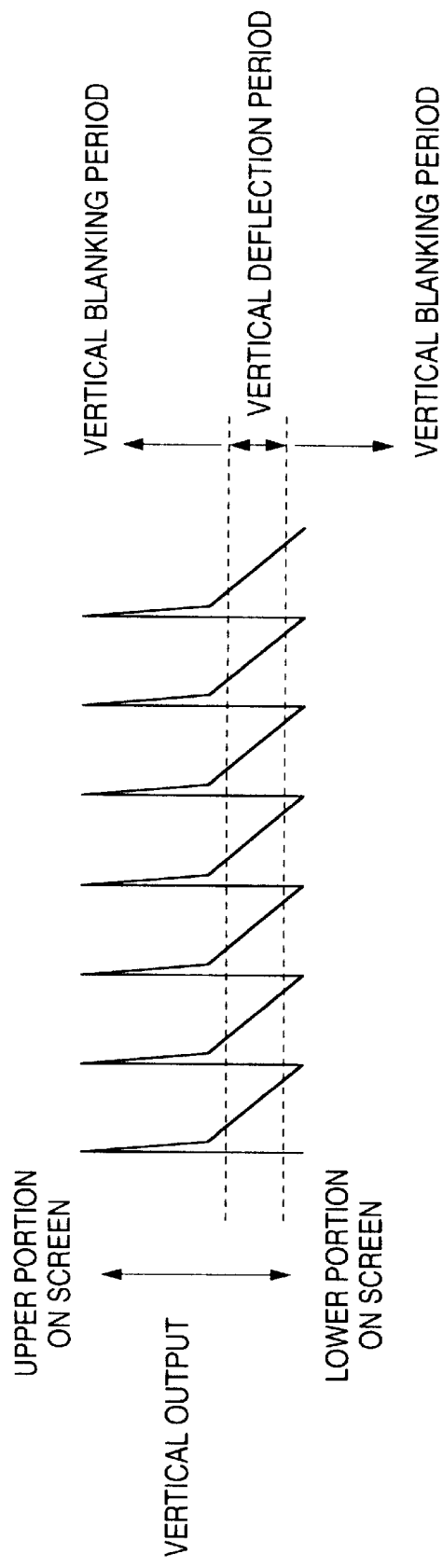
FIG. 2(b)

FIG. 4(a) POWER SOURCE
FIG. 4(b) SPOT KILLER PULSE
FIG. 4(c) VERTICAL OUTPUT
FIG. 4(d) HIGH VOLTAGE

BRAUN TUBE DISCHARGE APPARATUS

BACKGROUND OF THE INVENTION

1. Field of the Invention

The present invention relates to a Braun tube discharge apparatus, and relates especially to a Braun tube discharge apparatus that includes a so-called spot killer function.

2. Description of the Related Art

A conventional Braun tube discharge apparatus that includes a spot killer function, such as is shown in FIG. 5, is disclosed in Japanese Patent Unexamined Publication No. Hei. 10-248019.

In FIG. 5, a vertical pulse signal, obtained by the performance of a synchronous separation operation at a one-chip IC 1, is output via a vertical drive signal output terminal 1a, and is input to a vertical deflection IC 2 via a vertical trigger input terminal 2a. Upon receiving the vertical pulse signal, the vertical deflection IC 2 generates a saw-toothed voltage signal that it outputs via a vertical amplitude control terminal 2b. The saw-toothed signal is employed to drive an electron beam vertically. As for the saw-toothed signal, the side above a predetermined center potential corresponds to the scan location in the upper portion of the screen, and the side below the predetermined center potential corresponds to the scan location in the lower portion of the screen.

Upon receiving a power-OFF instruction, the one-chip IC 1 outputs a spot killer command signal via a spot killer command terminal 1b, and upon receiving this command signal, a spot killer circuit discharges, within a short period of time, a residual electrical charge that is held by the anode of a Braun tube. When the electrical charge that is discharged strikes the screen, the screen glows momentarily. At that time, when an impact point is fixed, an electrical charge will concentrate on that point every time the power is turned off, and a burn in the Braun tube will occur. Therefore, even when the power-OFF instruction is issued, the vertical deflection IC 2 is activated to validate the vertical drive, so that the electrical charge can be dispersed vertically when it is discharged.

However, if only the vertical drive is validated, a lightning-shaped flash of light will be displayed vertically on the screen. This may frighten a user, or the user may assume that a specific failure has occurred. Therefore, in the discharge apparatus shown in FIG. 5, the path between the collector and the emitter of a transistor Q1 is rendered conductive in accordance with the output of the spot-killer command signal, and a vertical pulse signal transmission path is grounded. Then, the voltage input at the vertical trigger input terminal 2a goes to a low level and the scan location is moved to the lower portion of the screen. On the other hand, when the vertical pulse signal transmission path is grounded, the base voltage of a transistor Q2 is changed, so that the path between the collector and the emitter of the transistor Q2 is rendered conductive, and the emitter potential is drastically reduced. Accordingly, there is a drastic increase in the amplitude of a saw-toothed signal, and the length of the vertical axis of the screen is increased. That is, when the residual electrical charge is discharged from the anode of the Braun tube, the scan location is moved to the lower portion of the screen, so that it is difficult for a user to recognize it. Further, since the length of the vertical axis of the screen is increased, even when a point on the screen glows, the light-emitting point is moved outside the screen frame, and the lightning-shaped flash of light is not displayed.

According to a Braun tube discharge apparatus disclosed in Japanese Patent Unexamined Publication No. Hei. 5-191753, when the power is switched off, the screen is turned off at a constant timing in synchronism with a vertical sync signal. In this publication, it is taught that in this manner the quality for the turning off of the screen can be improved.

The following problem is encountered in the above conventional apparatuses.

Since it is presumed that the first conventional apparatus is employed for the vertical deflection IC of a vertical pulse drive type or the like, this apparatus can not be employed for a vertical deflection IC of a so-called vertical ramp drive type or the like. This is because when a vertical deflection IC of the vertical ramp drive type receives a vertical ramp drive signal, it returns part of the output as negative feedback input, performs differential amplification of the negative feedback input, and outputs the result. Even when grounding of the path for the input of the vertical ramp drive signal is synchronized with the spot killer circuit, the same effects can not be obtained.

For the second conventional apparatus, although the screen is turned off in accordance with a constant timing, the above-described arrangement can not prevent the display of a flash of light.

SUMMARY OF THE INVENTION

To resolve the above shortcomings, it is an object of the present invention to provide a Braun tube discharge apparatus that can be employed for a vertical deflection IC of the vertical ramp drive type, and that can protect a Braun tube and prevent the display of a flash of light.

To achieve the above object, according to a first aspect of the invention, there is provided a Braun tube discharge apparatus comprising: vertical ramp signal differential amplification means for receiving a vertical ramp signal to control a vertical amplitude and for returning a part of an output thereof as a negative feedback input, and for performing differential amplification of the vertical ramp signal and supplying the result to a vertical deflection coil; spot killer means for discharging a remaining electrical charge in a Braun tube when a power is turned off; and negative feedback input path voltage control means for, in synchronization with the spot killer means, dropping, to a low level, a voltage along a negative feedback input path in the vertical ramp signal differential amplification means.

According to the Braun tube discharge apparatus thus arranged, the vertical ramp signal differential amplification means receives a vertical ramp signal to control vertical amplitude, returns a part of the output as a negative feedback input, performs differential amplification of the vertical ramp signal, and outputs the resultant signal to the vertical deflection coil. When the spot killer means discharges the residual electrical charge from the Braun tube when the power is turned off, the negative feedback input path voltage control means reduces, to a low level, the voltage along the negative feedback input path of the vertical ramp signal differential amplification means. Then, the DC voltage along the negative feedback input path is drastically reduced, and the center DC value of a signal output by the vertical ramp signal differential amplification means is increased. At the same time the AC element of the negative feedback input path is lost, and the amplitude of a signal to be output is increased.

Specifically, relative to the signal output by the vertical ramp signal differential amplification means, a predetermined center DC value corresponds to the middle scan location along the vertical axis of the screen, and as the DC value is changed above or below the center DC value, the DC value corresponds to the scan location at the ends of the vertical axis. Therefore, as the center DC value is increased, the scan location is moved along the vertical axis to the bottom edge of the screen, and as the amplitude is increased, the length of the vertical axis of the screen is also increased. Therefore, it is highly probable that the position whereat the residual charge is discharged by the spot killer means will lie outside the screen frame, and even if the point whereat the residual charge is discharged should lie within the screen frame, any light-emitting point will momentarily be pushed outside the screen frame, so that a flash of light will not be displayed on the screen.

According to a second aspect of the invention, there is provided a Braun tube discharge apparatus comprising: vertical ramp signal differential amplification means for receiving a vertical ramp signal to control a vertical amplitude and returning a part of an output thereof as a negative feedback input, and for performing differential amplification of the vertical ramp signal and supplying the resultant signal to a vertical deflection coil; spot killer means for discharging a residual electrical charge held in a Braun tube when a power is turned off; and vertical output operation means for, in synchronization with the spot killer means, changing a center potential of a signal output by the vertical ramp signal differential amplification means, and increasing the amplitude of the signal.

BRIEF DESCRIPTION OF THE DRAWINGS

FIGS. 2(a) and 2(b) are waveform diagrams respectively showing a vertical ramp signal and a vertical output signal.

DETAILED DESCRIPTION OF THE PREFERRED EMBODIMENT

An embodiment of the present invention will now be described.

Figure 1:
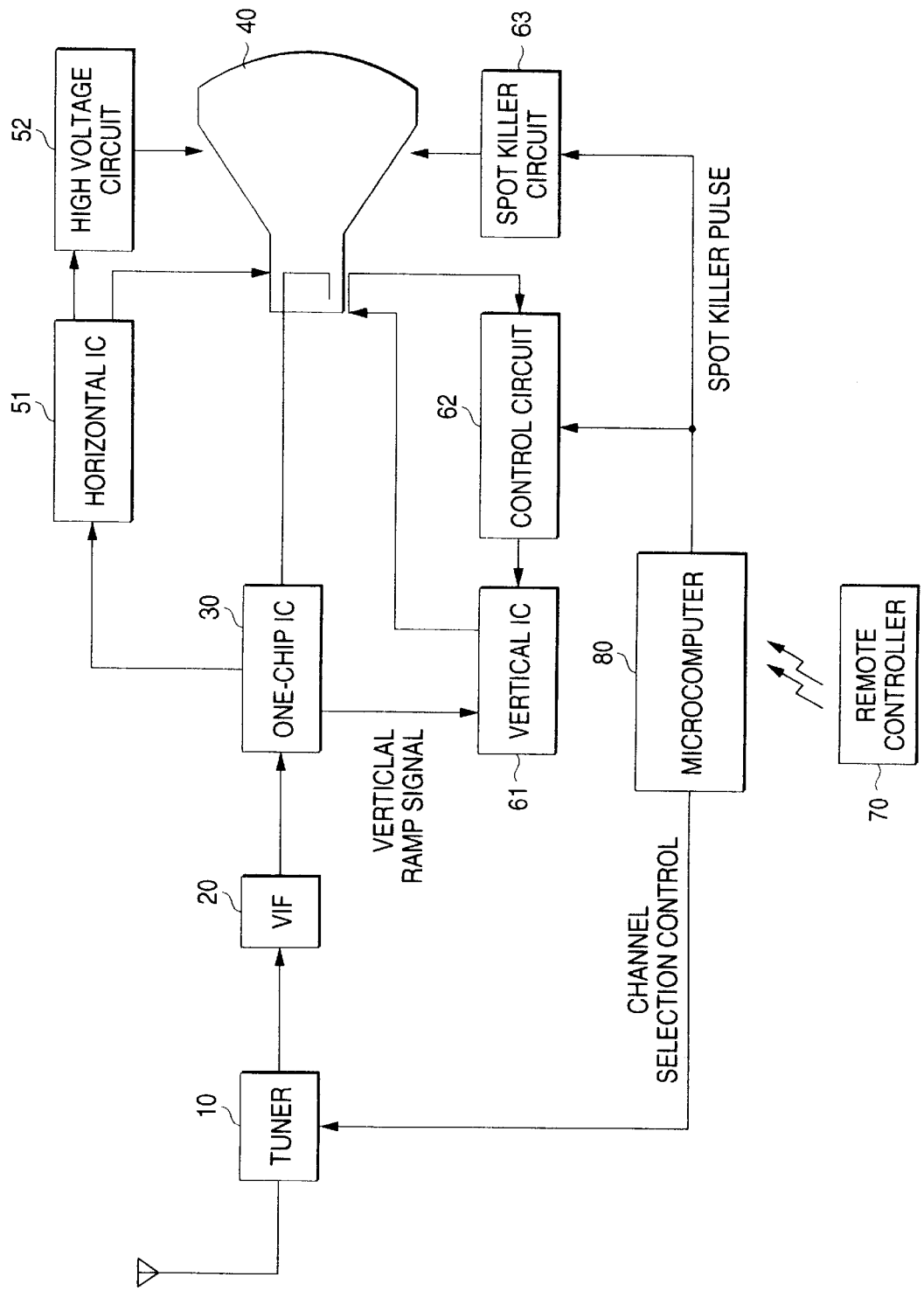
FIG. 1 is a schematic block diagram showing the arrangement of a television set that employs a Braun tube discharge apparatus according to an embodiment of the present invention.

FIG. 1 is a schematic block diagram showing the arrangement of a television set that employs a Braun tube discharge apparatus according to the embodiment of the present invention.

In FIG. 1, a tuner 10 selects only a necessary signal from a television broadcast signal, performs high-frequency amplification to convert the selected signal into an intermediate-frequency signal, and outputs the intermediate-frequency signal to a VIF circuit 20. The VIF circuit 20 performs video intermediate-frequency amplification for the received signal, and outputs the resultant signal to a one-chip IC 30. The one-chip IC 30 performs video detection for the signal received from the VIF circuit 20, performs a predetermined signal process for the detected output, and generates a video signal and supplies it to a Braun tube 40. Also, the one-chip IC 30 separates the detected output into a horizontal sync signal and a vertical sync signal, and outputs a horizontal drive signal and a vertical drive signal that are synchronized respectively with the horizontal and vertical sync signals.

The horizontal drive signal output by the one-chip IC 30 is supplied to a horizontal IC 51, and the horizontal IC 51 generates a predetermined horizontal output signal and transmits it to a horizontal deflection coil (not shown) in the Braun tube 40. As a result, an electron beam is driven horizontally. A high-frequency pulse generated by the horizontal IC 51 is supplied to a high voltage circuit 52 that is constituted by a flyback transformer and the like. The high voltage circuit 52 generates a high voltage to be applied to the anode of the Braun tube 40, or a high voltage that may be requested for another circuit or the like.

The vertical drive signal output by the one-chip IC 30 is transmitted to a vertical IC-61. The vertical drive signal is a vertical ramp signal having the saw-toothed shape shown in FIG. 2(a). The vertical IC 61 receives the vertical ramp signal, feeds back a part of the output via a control circuit 62, performs differential amplification for this output, and generates a vertical output signal shown in FIG. 2(b). The vertical output signal is then transmitted to a vertical deflection coil of the Braun tube 40 to drive an electron beam vertically. As is shown in FIG. 2(b), toward the top, the portion of the signal corresponds to the scan location in the upper portion of the screen, and toward the bottom, the portion corresponds to the scan location in the lower portion of the screen. Predetermined areas in the top and bottom of the signal are vertical blanking periods, and the middle area is a vertical deflection period that affects the scan location on the actual screen.

In this embodiment, an instruction for selecting a channel for the tuner 10, or for powering on or off, can be issued by operating a remote controller 70. Specifically, when a user depresses an operation button on the remote controller 70, an infrared remote control signal associated with the depressed button is transmitted. A microcomputer 80 in the main body receives the infrared remote control signal via a remote control signal light-receiving unit (not shown), detects the contents of the signal, and selects a channel at the tuner 10 or turns the power on or off.

Further, in this embodiment, a spot killer circuit 63 is provided for discharging a remaining electrical charge held by the anode of the Braun tube 40 when the power is turned off. When a power-OFF instruction is issued by the remote controller 70, the microcomputer 80 cuts off the supply of power to the internal circuits in accordance with a predetermined sequence. When the microcomputer 80 cuts off the supply of power to the high voltage circuit 52, the microcomputer 80 also outputs a spot killer pulse signal and activates the spot killer circuit 63. In this embodiment, the spot killer circuit 63 and the microcomputer 80 for instructing the activation of the spot killer circuit 63 constitute the spot killer means.

When the spot killer circuit 63 is activated and electron beams discharged by the anode of the Braun tube 40 strike the screen, light is emitted at the points that are struck. If the driving of the electron beam is halted, the light-emitting points will be concentrated at one location and burn in the Braun tube 40 will occur. Therefore, even after the supply of power to the high voltage circuit 52 is halted, operation of the one-chip IC 30 and the vertical IC 61 is continued for a short period of time, so that the vertical drive is validated and disperses the light-emitting points.

However, since a flash of light will be vertically displayed on the screen if merely the vertical drive is validated, a user may be frightened by that light or may fear that it is a symptom of the occurrence of a unit failure. Therefore, the apparatus in this embodiment is so designed that burn in the Braun tube 40 is prevented, and a flash of light is not displayed on the screen. This arrangement will now be described.

Figure 3:
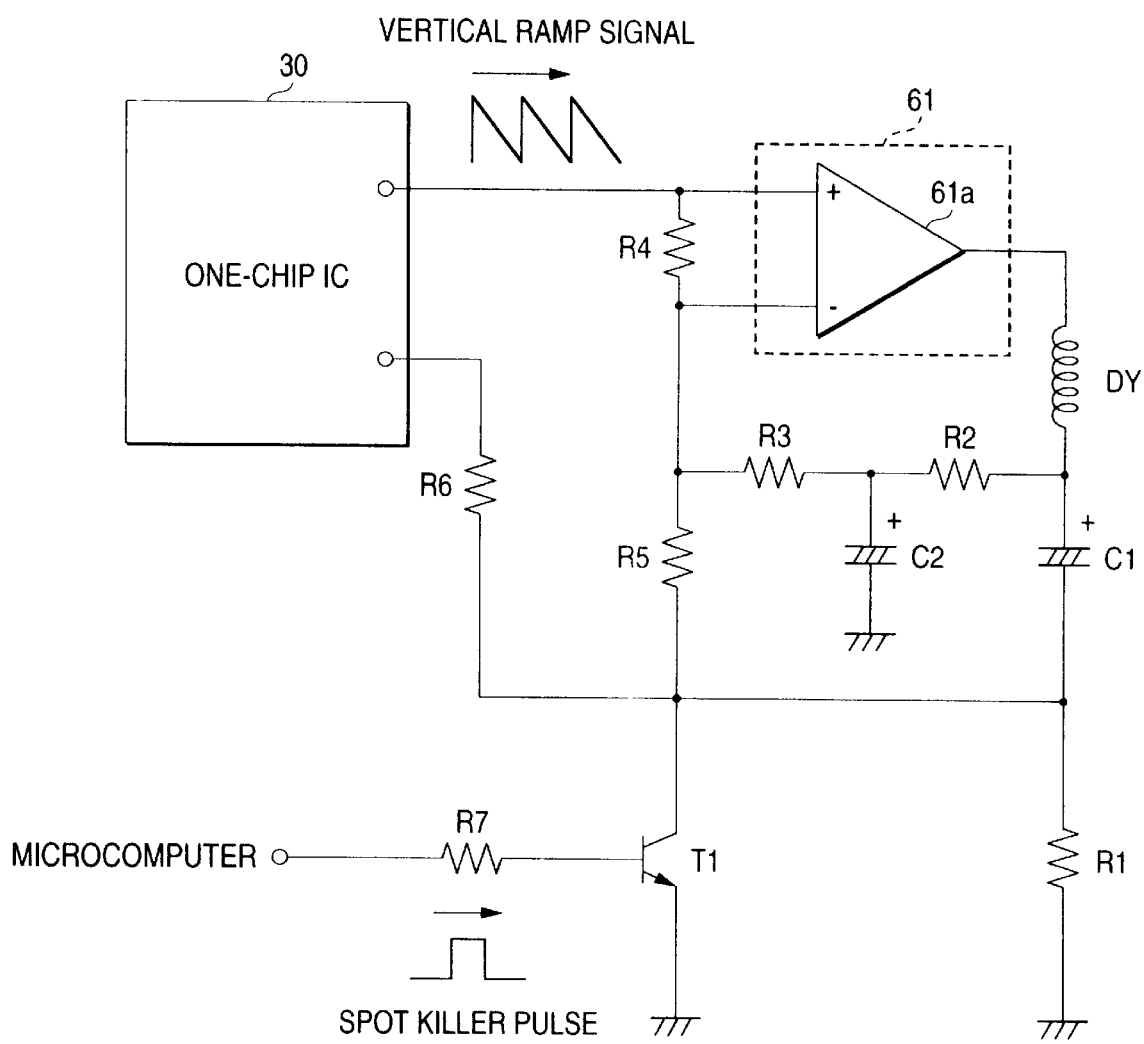
FIG. 3 is a circuit diagram showing the essential portion of the Braun tube discharge apparatus.

FIG. 3 is a circuit diagram showing the essential portion of the Braun tube discharge apparatus according to this embodiment.

In FIG. 3, an operational amplifier 61a is included in the vertical IC 61, and a vertical ramp signal from the one-chip IC 30 is supplied to the non-inversion input terminal of the operational amplifier 61a, while a vertical deflection coil DY is connected to the output terminal. In addition, resistors R1 to R6, capacitors C1 and C2 and the like, which constitute the control circuit 62 shown in FIG. 1, are provided appropriately, so that a part of the output of the operational amplifier 61a is returned as a negative feedback to the inversion input terminal. That is, the operational amplifier 61a receives a part of the output as a negative feedback and performs the differential amplification of it. As a result, the operational amplifier 61a removes a noise element that is common to the two inputs, and renders the vertical deflection coil DY active for the performance of the vertical drive. In this embodiment, the above circuit structure constitutes the vertical ramp signal differential amplification means.

The collector of an NPN switching transistor T1, the emitter of which is grounded, is connected to the junction of the resistors R5 and R6, and the base of the NPN switching transistor T1 is connected via a resistor R7 to the signal output path for a spot killer pulse signal. As is described above, when a spot killer pulse signal is output by the microcomputer 80, the base voltage of the switching transistor T1 is changed and the path between the collector and the emitter is rendered conductive. However, since the emitter of the switching transistor T1 is grounded, the negative feedback input path of the operational amplifier 61a is grounded. Therefore, in this embodiment, the thus arranged switching transistor T1, the resistor R7 and the microcomputer 80 constitute the negative feedback input path voltage control means.

It can be easily understood that the grounding of the negative feedback input path of the operational amplifier 61a means that a DC voltage carried on the negative feedback input path will be reduced, and accordingly, the center DC value of the vertical output signal shown in FIG. 2(b) will be increased. Further, the grounding of the negative feedback input path also means that the AC element carried on the negative feedback input path will be lost, and accordingly, the amplitude of the vertical output signal will be increased. In other words, as the center DC value is increased, the scan location is moved upward on the screen, and as the amplitude of the vertical output signal is increased, the length of the vertical axis of the screen is increased.

As is described above, since the top side of the vertical output signal is a vertical blanking period, and since the center DC value is increased, the possibility becomes greater that a remaining electrical charge held by the anode of the Braun tube 40 will be discharged in a time period corresponding to the vertical blanking period. In this case, no light emission occurs on the screen. If a remaining charge held by the anode of the Braun tube 40 is discharged in a time period corresponding to the vertical deflection period, light-emitting points will appear on the screen. However, since vertically the size of the screen has been increased, the light-emitting points are pushed momentarily outside the screen frame, and a flash of light will not be displayed.

The operation of the embodiment constructed as described above will now be described while referring to timing charts for various signal waveforms shown in FIGS. 4(a) to 4(d).

Figure 4:
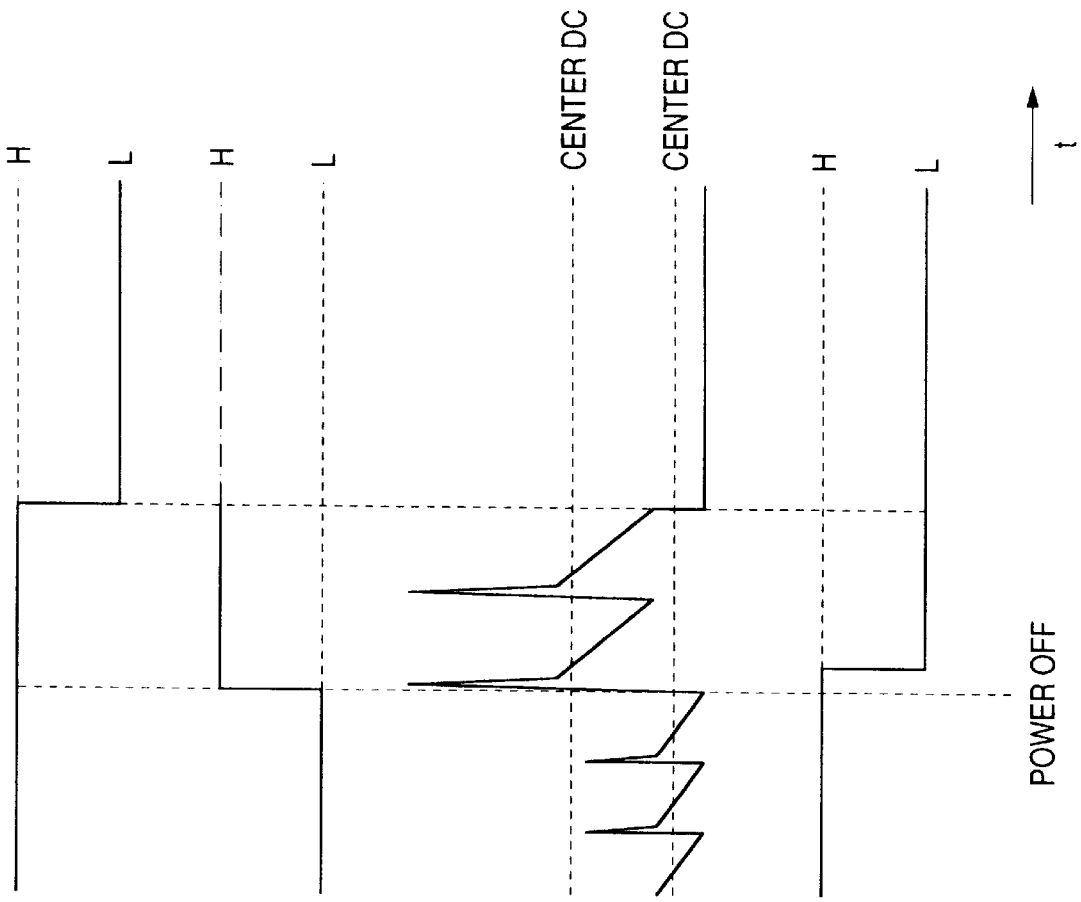
FIGS. 4(a) to 4(d) are timing charts showing various signal waveforms.
Figure 5:
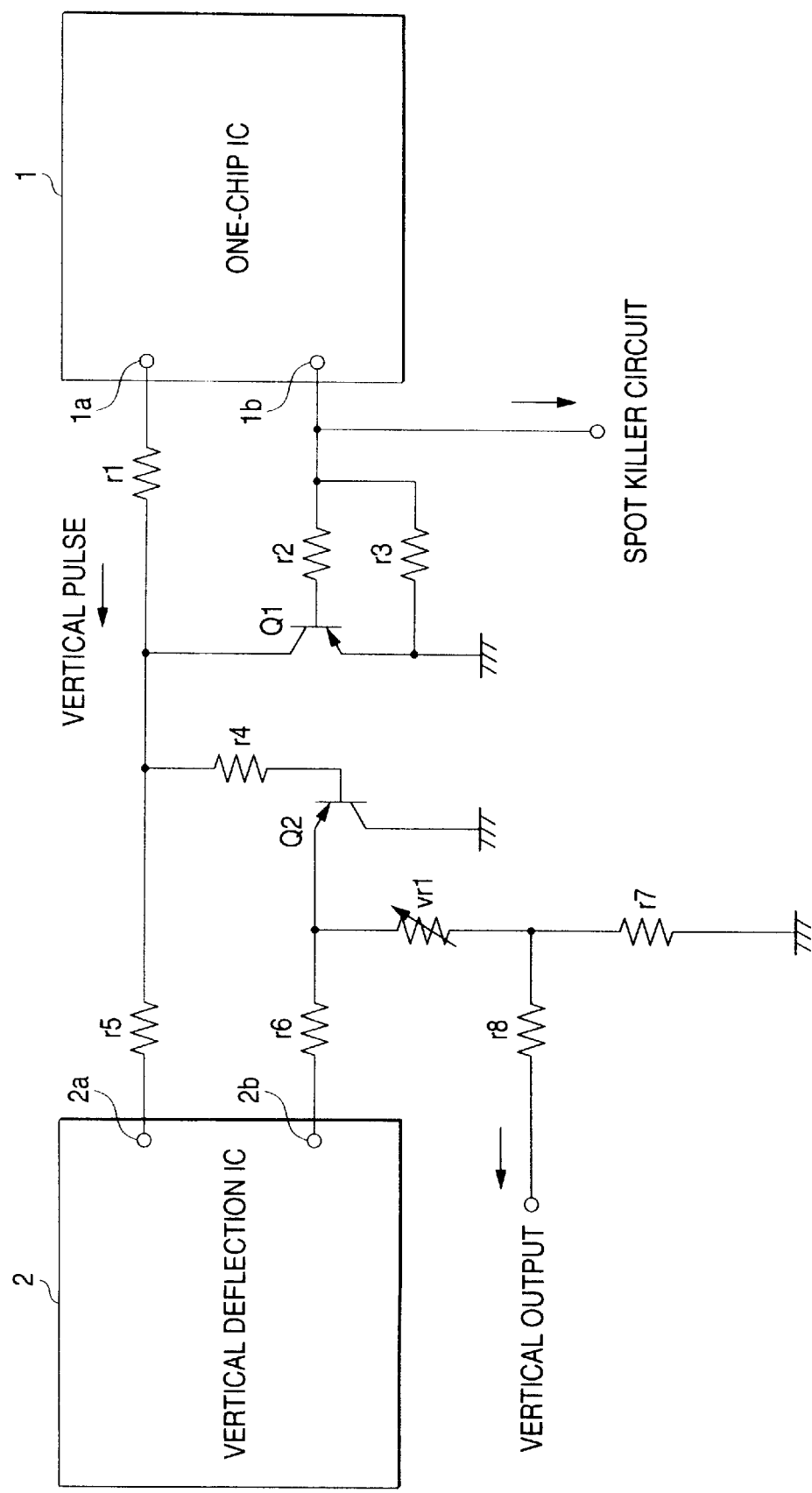
FIG. 5 is a circuit diagram showing the essential portion of a conventional Braun tube discharge apparatus.

Assume that the powering off of the television set is instructed by operating the remote controller 70, and a predetermined infrared remote control signal is transmitted by the remote controller 70 and is received by the microcomputer 80 of the television set. At this time, as is shown in FIG. 4(a), the supply of power to the one-chip IC 30 and the vertical IC 61 is not halted, while as is shown in FIG. 4(b), a spot killer pulse signal is transmitted at the time at which the power-OFF instruction is issued. As a result, the vertical output signal of the vertical IC 61 has the waveform shown in FIG. 4(c), and, as is shown in FIG. 4(d), following a slight delay after the power-OFF instruction is issued, the supply of power to the high voltage circuit 52 is halted.

When the spot killer pulse signal is output, the base voltage of the switching transistor T1, the emitter of which is grounded, is changed, the path between the collector and the emitter is rendered conductive, and the inversion input terminal of the operational amplifier 61a of the vertical IC 61 falls to the ground level. A vertical ramp signal from the one-chip IC 30 is received at the non-inversion input terminal of the operational amplifier 61a, and the vertical deflection coil DY is connected to the output terminal. Further, a part of the output is input as a negative feedback to the inversion input terminal to perform differential amplification. When the path between the collector and the emitter of the switching transistor T1 is rendered conductive, the DC voltage of the negative feedback input path is reduced, and the center DC value of the vertical output signal is increased, as is shown in FIG. 4(c). In addition, when the negative feedback input path falls to the ground level, it means that the AC element has been lost, and accordingly, the amplitude of the vertical output signal is increased.

In accordance with the output of the spot killer pulse signal, the spot killer circuit 63 discharges a remaining electrical charge held by the anode of the Braun tube 40. At this time, as well as at the time a normal television image is received, an electron beam is driven vertically by the vertical output signal. Incidentally, as is shown in FIG. 2(b), the portion toward the top of the vertical output signal corresponds to the scan location in the upper portion of the screen, and the portion toward the bottom corresponds to the scan location in the lower portion of the screen. The predetermined areas in the top and bottom portions are vertical blanking periods, and the middle area is a vertical deflection period that affects the scan location on the actual screen. Then, as the center DC value is increased, the possibility becomes greater that a remaining electrical charge held by the anode of the Braun tube 40 will be discharged in a time period corresponding to the vertical blanking period, and in this case, areas of the screen will not glow. If the remaining electrical charge held by the anode of the Braun tube 40 is discharged in a time period corresponding to the vertical deflection period, a light-emitting point will appear on the screen. However, since the vertical size of the screen has been extended, the light-emitting point will be pushed momentarily outside the screen frame, and a flash of light will not appear.

As is described above, the operational amplifier 61a included in the vertical IC 61 receives the vertical ramp signal from the one-chip IC 30 at the non-inversion input terminal. The operational amplifier 61a also receives a part of the output as a negative feedback to the inversion input terminal, and performs differential amplification of it and transmits the results to the vertical deflection coil DY. At the time the spot killer circuit 63 discharges a remaining electrical charge held by the Braun tube 40 when the power is turned off, the switching transistor T1 is rendered conductive by using the spot killer pulse signal that instructs the activation of the spot killer circuit 63. When the negative feedback input side of the operational amplifier 61*a* drops to the ground level, the center DC value of the vertical output signal is increased, and the amplitude is increased. Therefore, a Braun tube discharge apparatus can be provided whereby when the power is turned off the electrical discharge range can be increased so that it extends outside the screen frame, and whereby the appearance of a flash of light can be prevented.

As is described above, according to the present invention, a Braun tube discharge apparatus can be provided that can be applied for a vertical IC of the vertical ramp drive type or the like, and that can protect a Braun tube and prevent the display of a flash of light when the power is turned off.

What is claimed is:

1. A Braun tube discharge apparatus comprising:

vertical ramp signal differential amplification means for receiving a vertical ramp signal to control a vertical amplitude and for returning a part of an output thereof as a negative feedback input, and for performing differential amplification of the vertical ramp signal and supplying the result to a vertical deflection coil;

spot killer means for discharging a remaining electrical charge in a Braun tube when a power is turned off; and negative feedback input path voltage control means for, in synchronization with said spot killer means, dropping, to a low level, a voltage along a negative feedback input path in said vertical ramp signal differential amplification means.

2. The Braun tube discharge apparatus according to claim 1, wherein said vertical ramp signal differential amplification means includes an operational amplifier for receiving the vertical ramp signal at a non-inversion input terminal thereof, and for returning a part of an output thereof to an inversion input terminal thereof.

3. The Braun tube discharge apparatus according to claim 1, wherein said negative feedback input path voltage control means includes an NPN switching transistor, the collector of which is connected to the negative feedback input path and the emitter of which is grounded, and supplies a signal to the base of said NPN switching transistor to instruct an activation of said spot killer means.

4. A Braun tube discharge apparatus comprising:

vertical ramp signal differential amplification means for receiving a vertical ramp signal to control a vertical amplitude and returning a part of an output thereof as a negative feedback input, and for performing differential amplification of the vertical ramp signal and supplying the resultant signal to a vertical deflection coil;

spot killer means for discharging a residual electrical charge held in a Braun tube when a power is turned off; and vertical output operation means for, in synchronization with said spot killer means, changing a center potential of a signal output by said vertical ramp signal differential amplification means, and increasing the amplitude of said signal.

\* \* \* \* \*